(12) United States Patent
Takahashi et al.

(10) Patent No.: US 8,729,187 B2
(45) Date of Patent: May 20, 2014

(54) HIGH-MOLECULAR-WEIGHT COPOLYMER

(75) Inventors: Eiji Takahashi, Chiba (JP); Shinji Marumo, Chiba (JP); Gou Mishima, Chiba (JP)

(73) Assignee: Nippon Soda Co., Ltd., Tokyo (JP)

( * ) Notice: Subject to any disclaimer, the term of this patent is extended or adjusted under 35 U.S.C. 154(b) by 16 days.

(21) Appl. No.: 13/384,929

(22) PCT Filed: Aug. 4, 2010

(86) PCT No.: PCT/JP2010/004894
§ 371 (c)(1),
(2), (4) Date: Jan. 19, 2012

(87) PCT Pub. No.: WO2011/016226
PCT Pub. Date: Feb. 10, 2011

(65) Prior Publication Data
US 2012/0123076 A1 May 17, 2012

(30) Foreign Application Priority Data
Aug. 4, 2009 (JP) ................................. 2009-181210

(51) Int. Cl.
*C08F 257/02* (2006.01)
(52) U.S. Cl.
USPC ........... 525/224; 525/219; 525/241; 525/308; 526/329.2
(58) Field of Classification Search
USPC ................ 525/219, 224, 241, 308; 526/329.2
See application file for complete search history.

(56) References Cited

U.S. PATENT DOCUMENTS

| 5,679,495 A | 10/1997 | Yamachika et al. |
| 6,042,997 A | 3/2000 | Barclay et al. |
| 2003/0215748 A1 | 11/2003 | Thackeray et al. |

FOREIGN PATENT DOCUMENTS

| JP | 07-209868 | 8/1995 |
| JP | 10-168132 | 6/1998 |
| JP | 11-167206 | 6/1999 |
| JP | 2001-139626 | 5/2001 |
| JP | 2001-139647 | 5/2001 |
| JP | 2002-047322 | 2/2002 |
| JP | 2007-246600 | 9/2007 |
| WO | 01/18083 | 3/2001 |
| WO | 01/18084 | 3/2001 |
| WO | 01/18603 A2 | 3/2001 |
| WO | 01/18603 A3 | 9/2001 |
| WO | 2008/026401 | 3/2008 |

OTHER PUBLICATIONS

Machine translation of JP 2002-047322 A (Feb. 12, 2002).*
Machine translation of 10-168132 A (Jun. 23, 1998).*
English-language Abstract of 10-168132 A (Jun. 23, 1998).*
International Preliminary Report on Patentability issued for PCT/JP2010/004894, dated Mar. 13, 2012, 5 pages.
EP Communication including Supplementary European Search Report from EP Appln. No. 10 80 6226.6, Nov. 16, 2012, 5 pages.
International Search Report dated Oct. 12, 2010 issued for PCT/JP2010/004894, 2 pages.

* cited by examiner

*Primary Examiner* — Vu A Nguyen
(74) *Attorney, Agent, or Firm* — Kenyon & Kenyon, LLP

(57) ABSTRACT

It is an object of the present invention to provide (1) a copolymer for a cured product that is satisfactory in properties, such as adhesion properties, as a chip stacking adhesive or the like. The present invention is a copolymer comprising repeating units represented by formula (I), formula (II), and formula (III), (wherein $R_1$, $R_2$, and $R_3$ each independently represent a hydrogen atom or a methyl group, $R_4$ represents an alkyl group or a cycloalkyl group, $R_5$ represents a hydrogen atom or a $C_1$ to $C_6$ alkyl group, m, n, and k represent a molar ratio of the respective repeating units, m represents a positive number of 0 or more and less than 1, n and k each independently represent a positive number, and satisfy a relation of $m+n+k=1$), and having a weight-average molecular weight in the range of 50,000 to 200,000.

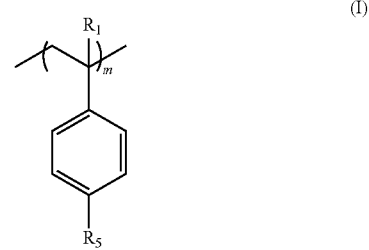

(I)

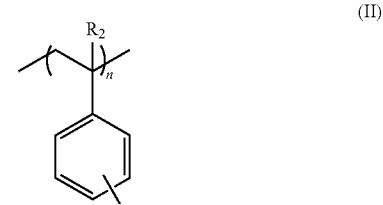

(II)

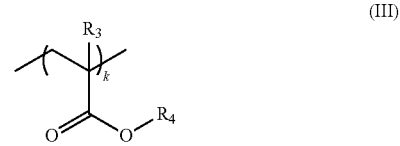

(III)

3 Claims, No Drawings

HIGH-MOLECULAR-WEIGHT COPOLYMER

TECHNICAL FIELD

The present invention relates to a copolymer suitable for insulating resin compositions used for surface protection films, interlayer insulating films, chip stacking adhesives, and the like for semiconductor devices and the like. This application claims priority to Japanese Patent Application No. 2009-181210 filed on Aug. 4, 2009, the content of which is incorporated herein.

BACKGROUND ART

As a polymer for a cured product that is excellent in properties, such as electrical insulation properties, thermal shock resistance, and adhesion properties, a copolymer (A) having 10 to 99 mole % of a structural unit (A1) represented by the following formula (1) and 90 to 1 mole % of a structural unit (A2) represented by the following formula (2) (provided that the total of all constituent units constituting the copolymer (A) is 100 mole %) is known (see Patent Document 1).

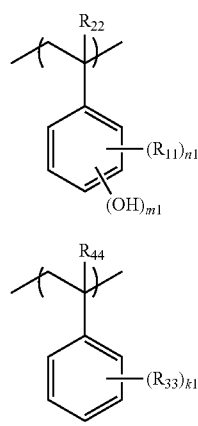

(wherein $R_{11}$ and $R_{33}$ each independently represent an alkyl group having 1 to 4 carbon atoms, an alkoxy group, or an aryl group, $R_{22}$ and $R_{44}$ each independently represent a hydrogen atom or a methyl group, m1 represents an integer of 1 to 3, n1 and k1 each independently represent an integer of 0 to 3, and m1+n1≤5.)

More specifically, a copolymer (Mw=10,000, Mw/Mn=3.5) consisting of p-hydroxystyrene/styrene/methyl methacrylate=80/10/10 (molar ratio) is described.

PRIOR ART DOCUMENTS

Patent Document

Patent Document 1: WO2008-026401

SUMMARY OF THE INVENTION

Object to be Solved by the Invention

A problem of the above copolymer is that satisfactory properties as a chip stacking adhesive are not necessarily obtained.

It is an object of the present invention to provide a copolymer for a cured product that is satisfactory in properties, such as heat resistance, crack resistance, high temperature adhesiveness, and adhesion properties, as a chip stacking adhesive or the like.

Means to Solve the Object

The present inventors have studied diligently to solve the above object, and, as a result, found that a polymer satisfying the above properties is obtained by bonding a repeating unit of an aryl moiety and a repeating unit of an acrylate moiety in blocks and moreover providing a high molecular weight of 50,000 or more, leading to the completion of the present invention.

Specifically, the present invention relates to:

(1) a copolymer comprising repeating units represented by formula (I), formula (II), and formula (III):

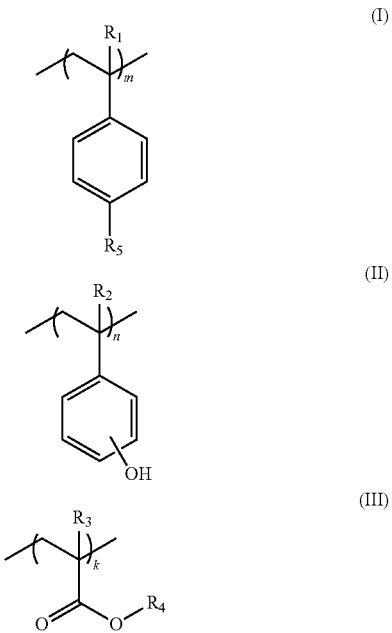

(wherein $R_1$, $R_2$, and $R_3$ each independently represents a hydrogen atom or a methyl group, $R_4$ represents an alkyl group which may have a hydroxy group, or a cycloalkyl group; $R_5$ represents a hydrogen atom or a $C_1$ to $C_6$ alkyl group, m, n, and k represent a molar ratio of the respective repeating units; m represents a positive number of 0 or more and less than 1, n and k each independently represent a positive number, and satisfy a relation of m+n+k=1), and having a weight-average molecular weight in the range of 50,000 to 200,000;

(2) the copolymer according to (1), wherein the repeating units represented by formula (I) and formula (II) and the repeating unit represented by formula (III) are bonded by block bonding;

(3) the copolymer according to (2), wherein for the repeating units represented by formula (I) and formula (II), the repeating unit represented by formula (I) and the repeating unit represented by formula (II) are randomly bonded; and (4) the copolymer according to any one of (1) to (3), wherein a ratio of weight-average molecular weight (Mw) to number-average molecular weight (Mn) (Mw/Mn) is in the range of 1.01 to 1.50.

MODE OF CARRYING OUT THE INVENTION

The copolymer of the present invention comprises repeating units represented by formula (I), formula (II), and formula (III), and has a weight-average molecular weight in the range of 50,000 to 200,000.

In formula (I), $R_1$ represents a hydrogen atom or a methyl group.

$R_5$ represents a hydrogen atom or a $C_1$ to $C_6$ alkyl group. Specific examples of the alkyl group can include a methyl group, an ethyl group, a n-propyl group, an isopropyl group, a n-butyl group, an isobutyl group, a s-butyl group, a t-butyl group, a n-pentyl group, an isopentyl group, a s-pentyl group, a t-pentyl group, a neopentyl group, and a n-hexyl group.

In formula (II), $R_2$ represents a hydrogen atom or a methyl group.

In formula (III), $R_3$ represents a hydrogen atom or a methyl group.

$R_4$ represents an alkyl group which may have a hydroxy group or a cycloalkyl group. Specific examples thereof can include an alkyl group which may have a hydroxy group, such as methyl group, ethyl group, n-propyl group, isopropyl group, n-butyl group, isobutyl group, s-butyl group, t-butyl group, n-pentyl group, isopentyl group, s-pentyl group, t-pentyl group, neopentyl group, n-hexyl group, n-heptyl group, n-octyl group, n-nonyl group, or n-decyl group, 2-hydroxyethyl group, 3-hydroxypropyl group, or 2,2-dimethyl-3-hydroxypropyl group, or a cycloalkyl group, such as cyclopropyl group, cyclobutyl group, cyclopentyl group, cyclohexyl group, 1-ethylcyclohexyl group, norbornyl group, dicyclopentanyl group, tricyclodecanyl group, 1-adamantyl group, or isoboronyl group.

The bonding manner of the repeating unit represented by formula (I), the repeating unit represented by formula (II), and the repeating unit represented by formula (III) is not particularly limited. Specific examples of the bonding manner can include random bonding, block bonding, alternate bonding, or graft bonding.

Especially, it is preferable that the repeating units (B12) represented by formula (I) and formula (II) and the repeating unit (B3) represented by formula (III) be block-bonded. The bonding manner of the repeating unit (B1) represented by formula (I) and the repeating unit (B2) represented by formula (II) included in (B12) is not particularly limited. Specific examples of the bonding manner can include random bonding, block bonding, alternate bonding, or graft bonding, and random bonding is particularly preferable.

The molar ratio of the repeating units (B1) to (B3) is not particularly limited. Preferred examples of (B1)+(B2)/(B3) can include the range of 90/10 to 60/40. Preferred examples of (B1)/(B2) can include the range of 90/10 to 10/90.

The weight-average molecular weight of the copolymer of the present invention is in the range of 50,000 to 200,000, preferably 70,000 to 200,000, and especially, particularly preferably in the range of 70,000 to 160,000.

The ratio of weight-average molecular weight (Mw) to number-average molecular weight (Mn) (Mw/Mn) of the copolymer of the present invention is preferably in the range of 1.01 to 2.50, further preferably in the range of 1.01 to 1.50.

The method for the production of the copolymer of the present invention is not particularly limited as long as it is a production process in which one having a molecular weight in the range of Mw=50,000 to 200,000 can be made. For example, known methods, such as radical polymerization, anionic polymerization, cationic polymerization, and living polymerization, can be used.

Specific example of raw material monomers used for the production of the present invention can include double bond-containing compounds represented by the following formulas (IV) to (VI) corresponding to formulas (I) to (III).

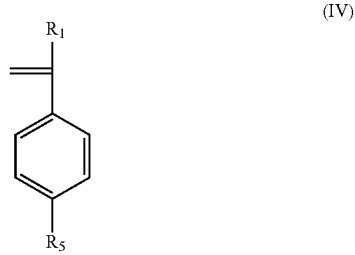

(IV)

(V)

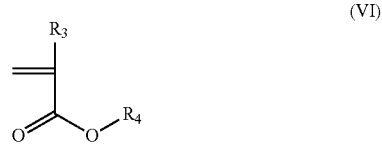

(VI)

(wherein $R_1$ to $R_4$ each represent the same meaning as the above).

Specific examples of the compound represented by formula (IV) can include styrene, α-methylstyrene, 4-methylstyrene, 4-ethylstyrene, 4-n-butylstyrene, and 4-t-butylstyrene.

Specific examples of the compound represented by formula (V) can include 4-hydroxystyrene, 3-hydroxystyrene, 4-hydroxy-α-methylstyrene, and 3-hydroxy-α-methylstyrene.

Specific examples of the compound represented by formula (VI) can include methyl acrylate, ethyl acrylate, n-propyl acrylate, isopropyl acrylate, n-butyl acrylate, isobutyl acrylate, s-butyl acrylate, t-butyl acrylate, n-pentyl acrylate, n-hexyl acrylate, n-heptyl acrylate, methyl methacrylate, ethyl methacrylate, n-propyl methacrylate, isopropyl methacrylate, n-butyl methacrylate, isobutyl methacrylate, s-butyl methacrylate, t-butyl methacrylate, n-pentyl methacrylate, n-hexyl methacrylate, and n-heptyl methacrylate.

Specific examples of the combination of the repeating units (I) to (III) constituting the copolymer of the present invention can include combinations as shown below. The repeating units are represented by monomers corresponding to them.

Specific examples of the combination can include styrene/4-hydroxystyrene/methyl acrylate, styrene/4-hydroxystyrene/ethyl acrylate, styrene/4-hydroxystyrene/t-butyl acrylate, α-methylstyrene/4-hydroxystyrene/methyl acrylate, α-methylstyrene/4-hydroxystyrene/ethyl acrylate, α-methylstyrene/4-hydroxystyrene/t-butyl acrylate, styrene/α-methyl-4-hydroxystyrene/methyl acrylate, styrene/α-methyl-4-hydroxystyrene/ethyl acrylate, styrene/α-methyl-4-hydroxystyrene/t-butyl acrylate, styrene/3-hydroxystyrene/methyl acrylate, styrene/3-hydroxystyrene/ethyl acrylate, styrene/3-hydroxystyrene/t-butyl acrylate, styrene/4-hydroxystyrene/methyl methacrylate, styrene/4-hydroxystyrene/ethyl methacrylate, styrene/4-hydroxystyrene/t-butyl methacrylate, α-methylstyrene/4-hydroxystyrene/methyl methacrylate, α-methylstyrene/4-hydroxystyrene/ethyl methacrylate, α-methylstyrene/4-hydroxystyrene/t-butyl methacrylate, styrene/α-methyl-4-hydroxystyrene/methyl methacrylate, styrene/α-methyl-4-hydroxystyrene/ethyl methacrylate, styrene/α-methyl-4-hydroxystyrene/t-butyl methacrylate, styrene/3-hydroxystyrene/methyl methacrylate, styrene/3-hydroxystyrene/ethyl methacrylate, styrene/3-hydroxystyrene/t-butyl methacrylate, p-methylstyrene/4-hydroxystyrene/methyl acrylate, p-ethylstyrene/4-hydroxystyrene/methyl acrylate, p-t-butylstyrene/4-hydroxystyrene/methyl acrylate, and p-t-butylstyrene/4-hydroxystyrene/ethyl acrylate.

The present invention will be described in more detail below by Examples, but the scope of the present invention is not limited to the Examples.

EXAMPLE 1

Under a nitrogen atmosphere, a n-butyllithium (hereinafter abbreviated as n-BuLi) solution (1.78 g; 4 mmol) was added to a tetrahydrofuran (hereinafter abbreviated as THF) (400 g) solution of 2-mercaptothiazoline (0.12 g; 1 mmol) at room temperature, and the mixture was stirred for 15 minutes, and then cooled to −40° C. A n-BuLi solution (0.91 g; 2 mmol) was added, and a THF (65 g) solution to which p-t-butoxystyrene (hereinafter abbreviated as PTBST) (62.06 g; 352 mmol) and a dibutylmagnesium hexane solution (0.97 g; 1 mmol) were added was dropped over 15 minutes. After the completion of the dropping, a dibutylmagnesium hexane solution (0.79 g; 1 mmol) was added, and the mixture was stirred at the same temperature for 20 minutes. Then, a solution in which diphenylethylene (0.29 g; 2 mmol) and a dibutylmagnesium hexane solution (0.61 g; 1 mmol) were added to a 3.79% lithium chloride THF solution (7.76 g: 7 mmol) was dropped over 1 minute, and the mixture was stirred at the same temperature for 15 minutes, and then cooled to −50° C. A THF (15 g) solution to which methyl methacrylate (hereinafter abbreviated as MMA) (8.74 g; 87 mmol) and a diethylzinc hexane solution (0.82 g; 1 mmol) were added was dropped over 5 minutes, and the mixture was stirred at the same temperature for 60 minutes. Then, methanol was added to stop the reaction. The reaction liquid was measured by gas chromatography, but PTBST and MMA were not observed. The reaction solution was concentrated, and then, ethyl acetate was added, and the mixture was washed with water. The organic layer was concentrated, and then diluted with THF. The diluted solution in THF was dropped into methanol with stirring to precipitate a polymer, and the mixture was stirred for 1 hour. The polymer was filtered, and then dried under reduced pressure. The dry polymer (100 g) was dissolved in a toluene/ethanol (35/65 wt %) mixed solvent, and 25% concentrated hydrochloric acid was added. The mixture was heated and stirred at 70° C. for 4 hours. After cooling, ethyl acetate was added, and the mixture was neutralized with sodium hydrogen carbonate, and then washed with water. The organic layer was concentrated, and then, THF was added. The mixture was dropped into hexane with stirring to precipitate a polymer. The polymer was filtered, and then dried under reduced pressure.

The results of analyzing the obtained polymer by GPC were Mw=89500 and a degree of dispersion=1.17. The result of analyzing the composition ratio by $^{13}$C-NMR was p-hydroxystyrene (hereinafter abbreviated as PHS)/MMA (molar ratio)=80/20.

EXAMPLE 2

Under a nitrogen atmosphere, a n-BuLi solution (1.67 g; 4 mmol) was added to a THF (500 g) solution of 2-mercaptothiazoline (0.12 g: 1 mmol) at room temperature, and the mixture was stirred for 15 minutes, and then cooled to −40° C. A n-BuLi solution (0.68 g; 2 mmol) was added, and a THF (60 g) solution to which PTBST (31.03 g; 176 mmol), styrene (hereinafter abbreviated as ST) (18.73 g; 180 mmol), and a dibutylmagnesium hexane solution (1.19 g; 2 mmol) were added was dropped over 30 minutes. After the completion of the dropping, a dibutylmagnesium hexane solution (0.85 g; 1 mmol) was added, and the mixture was stirred at the same temperature for 15 minutes. Then, a solution in which diphenylethylene (0.37 g; 2 mmol) and a dibutylmagnesium hexane solution (0.32 g; 0.5 mmol) were added to a 3.79% lithium chloride THF solution (5.73 g: 5 mmol) was dropped over 2 minutes. After the completion of the dropping, the mixture was stirred for 15 minutes, and then cooled to −50° C. A THF (10 g) solution to which MMA (8.99 g; 90 mmol) and a diethylzinc hexane solution (1.00 g; 1 mmol) were added was dropped over 7 minutes, and the mixture was further stirred at the same temperature for 60 minutes. Methanol was added to stop the reaction. The reaction liquid was measured by gas chromatography, but PTBST, ST, and MMA were not observed. Then, the obtained polymer treated as in Example 1 was reacted as in Example 1.

The resulting polymer was analyzed by GPC. It had Mw=85300 and a degree of dispersion=1.19. The result of analyzing the composition ratio by $^{13}$C-NMR was PHS/ST/MMA (molar ratio)=41/41/18.

EXAMPLE 3

Under a nitrogen atmosphere, a n-BuLi solution (4.28 g; 10 mmol) was added to a THF (1350 g) solution of 2-mercaptothiazoline (0.36 g: 3 mmol) at room temperature, and the mixture was stirred for 15 minutes, and then cooled to −40° C. A n-BuLi solution (1.16 g; 3 mmol) was added, and a THF (60 g) solution to which PTBST (84.47 g; 479 mmol), ST (50.02 g; 480 mmol), and a dibutylmagnesium hexane solution (2.13 g; 3 mmol) were added was dropped over 25 minutes. The mixture was stirred at the same temperature for 5 minutes. Then, a butylmagnesium hexane solution (2.56 g; 4 mmol) was added, and the mixture was stirred for 5 minutes. Then, a solution in which diphenylethylene (1.08 g; 6 mmol) and a diethylzinc hexane solution (0.20 g; 0.3 mmol) were added to a 3.71% lithium chloride THF solution (8.54 g: 7 mmol) was dropped at the same temperature over 2 minutes. The mixture was stirred for 10 minutes, and then cooled to −50° C. Then, a THF (20 g) solution to which MMA (24.02 g; 240 mmol) and a diethylzinc hexane solution (0.46 g; 0.6 mmol) were added was dropped over 13 minutes, and the mixture was stirred at the same temperature for 60 minutes. Methanol was added to stop the reaction. The reaction solution was measured by gas chromatography, but PTBST, ST, and MMA were not observed. Then, the obtained polymer treated as in Example 1 was reacted as in Example 1.

The results of analyzing the obtained polymer by GPC were Mw=70000 and a degree of dispersion=1.08. The result of analyzing the composition ratio by $^{13}$C-NMR was PHS/ST/MMA (molar ratio)=41/42/17.

EXAMPLE 4

Under a nitrogen atmosphere, a n-BuLi solution (4.89 g; 12 mmol) was added to a THF (1340 g) solution of 2-mercaptothiazoline (0.36 g: 3 mmol) at room temperature, and the mixture was stirred for 15 minutes, and then cooled to −40° C. A n-BuLi solution (0.94 g; 2 mmol) was added, and a THF (60 g) solution to which PTBST (84.48 g; 479 mmol), ST (49.94 g; 480 mmol), and a dibutylmagnesium hexane solution (2.00 g; 3 mmol) were added was dropped over 27 minutes. The mixture was stirred at the same temperature for 5 minutes. A dibutylmagnesium hexane solution (1.91 g; 3 mmol) was added, and the mixture was stirred for 5 minutes. Then, a solution in which diphenylethylene (1.09 g; 6 mmol) and a diethylzinc hexane solution (0.22 g; 0.3 mmol) were added to a 3.71% lithium chloride THF solution (8.19 g; 7 mmol) was dropped over 2 minutes. After the completion of the dropping, the mixture was stirred for 15 minutes, and then cooled to −50° C. Then, a THF (20 g) solution to which MMA (24.01 g; 240 mmol) and a diethylzinc hexane solution (0.38 g; 0.5 mmol) were added was dropped over 12 minutes, and the mixture was stirred at the same temperature for 60 minutes. Methanol was added to stop the reaction. The reaction solution was measured by gas chromatography, but PTBST, ST, and MMA were not observed. Then, the obtained polymer treated as in Example 1 was reacted as in Example 1.

The results of analyzing the obtained polymer by GPC were Mw=90400 and a degree of dispersion=1.08. The result of analyzing the composition ratio by $^{13}$C-NMR was PHS/ST/MMA (molar ratio)=44/44/12.

EXAMPLE 5

Under a nitrogen atmosphere, a n-BuLi solution (1.57 g; 4 mmol) was added to a THF (500 g) solution of 2-mercaptothiazoline (0.12 g: 1 mmol) at room temperature, and the mixture was stirred for 15 minutes, and then cooled to −40° C. A n-BuLi solution (0.73 g; 2 mmol) was added, and a THF (60 g) solution to which p-(1-ethoxyethoxy)styrene (hereinafter abbreviated as PEES) (47.47 g; 242 mmol), ST (24.33 g; 234 mmol), and a dibutylmagnesium hexane solution (1.71 g; 2 mmol) were added was dropped over 23 minutes. The mixture was stirred for 5 minutes. Then, a dibutylmagnesium hexane solution (1.02 g; 1 mmol) was added, and the mixture was stirred for 10 minutes. Then, diphenylethylene (0.35 g; 2 mmol) was added, and the mixture was stirred for 10 minutes, and then cooled to −50° C. A solution in which a diethylzinc hexane solution (0.61 g; 1 mmol) was added to a 3.71% lithium chloride THF solution (9.26 g: 8 mmol) was dropped over 1 minute, and a THF (10 g) solution to which MMA (12.36 g; 123 mmol) and a diethylzinc hexane solution (0.64 g; 1 mmol) were added was dropped over 10 minutes. The mixture was stirred at the same temperature for 60 minutes, and methanol was added to stop the reaction. The reaction solution was measured by gas chromatography, but PEES, ST, and MMA were not observed. Then, concentrated hydrochloric acid (6.98 g; 69 mmol) was added, and the mixture was stirred at 50° C. for 1 hour. Then, triethylamine (5.22 g; 52 mmol) was added, and acetic acid (1.86 g; 31 mmol) was further added. Triethylamine/hydrochloride salt was filtered, and then concentrated. Water was added, and the mixture was stirred for 1 hour. Then, the precipitated polymer was filtered. The obtained polymer was dissolved in a mixed solvent of THF (450 g) and ethyl acetate (500 g), and the solution was washed with water. The organic layer was concentrated, and then, THF (200 g) was added to dissolve. The solution was dropped into hexane with stirring to precipitate a polymer. The precipitated polymer was filtered, and then dried under reduced pressure.

The results of analyzing the obtained polymer by GPC were Mw=75000 and a degree of dispersion=1.36. The result of analyzing the composition ratio by $^{13}$C-NMR was PHS/ST/MMA (molar ratio)=42/41/17.

EXAMPLE 6

Under a nitrogen atmosphere, a n-BuLi solution (4.89 g; 12 mmol) was added to a THF (700 g) solution of 2-mercaptothiazoline (0.23 g: 2 mmol) at room temperature, and the mixture was stirred for 60 minutes, and then cooled to −40° C. A n-BuLi solution (2.03 g; 5 mmol) was added, and a mixed solution of PTBST (22.63 g; 128 mmol), ST (40.41 g; 388 mmol), and a dibutylmagnesium hexane solution (0.88 g; 1 mmol) was dropped over 10 minutes. After 5 minutes from the completion of the dropping, a dibutylmagnesium hexane solution (0.81 g; 1 mmol) was added, and the mixture was stirred for 5 minutes. Then, a solution in which diphenylethylene (0.83 g; 5 mmol) and a diethylzinc hexane solution (0.33 g; 0.5 mmol) were added to a 3.79% lithium chloride THF solution (3.78 g: 3 mmol) was dropped over 1 minute. After the completion of the dropping, the mixture was stirred for 15 minutes, and cooled to −50° C. Then, a mixed solution of MMA (13.09 g; 131 mmol) and a diethylzinc hexane solution (0.23 g; 0.3 mmol) was dropped over 3 minutes. After the completion of the dropping, the mixture was stirred for 60 minutes, and methanol was added to stop the reaction. The reaction solution was measured by gas chromatography, but PTBST, ST, and MMA were not observed. Then, a polymer obtained by treatment as in Example 1 was reacted as in Example 1.

The results of analyzing the obtained polymer by GPC were Mw=104500 and a degree of dispersion=1.07. The result of analyzing the composition ratio by $^{13}$C-NMR was PHS/ST/MMA (molar ratio)=21/60/19.

EXAMPLE 7

Under a nitrogen atmosphere, a n-BuLi solution (1.99 g; 5 mmol) was added to THF (750 g) of 2-mercaptothiazoline (0.23 g: 2 mmol) at room temperature, and the mixture was stirred for 60 minutes, and then cooled to −40° C. A n-BuLi solution (0.47 g; 1 mmol) was added, and a mixed solution of PTBST (62.06 g; 352 mmol), ST (12.15 g; 117 mmol), and a dibutylmagnesium hexane solution (0.89 g; 1 mmol) was dropped over 10 minutes. After 5 minutes from the completion of the dropping, a dibutylmagnesium hexane solution (0.82 g; 1 mmol) was added, and the mixture was stirred for 5 minutes. Then, a solution in which diphenylethylene (0.95 g; 5.3 mmol) and a diethylzinc hexane solution (0.44 g; 0.6 mmol) were added to a 3.79% lithium chloride THF solution (4.08 g: 3.6 mmol) was dropped over 1 minute. After the completion of the dropping, the mixture was stirred for 15 minutes, and cooled to −50° C. Then, a mixed solution of MMA (11.64 g; 116 mmol) and a diethylzinc hexane solution (0.27 g; 0.4 mmol) was dropped over 2 minutes, and the mixture was stirred at the same temperature for 60 minutes. Methanol was added to stop the reaction. The reaction solution was measured by gas chromatography, but PTBST, ST, and MMA were not observed. Then, a polymer obtained by treatment as in Example 1 was reacted as in Example 1.

The results of analyzing the obtained polymer by GPC were Mw=123500 and a degree of dispersion=1.07. The result of analyzing the composition ratio by $^{13}$C-NMR was PHS/ST/MMA (molar ratio)=61/20/19.

EXAMPLE 8

Under a nitrogen atmosphere, a n-BuLi solution (2.89 g; 7 mmol) was added to THF (700 g) of 2-mercaptothiazoline (0.14 g: 1.2 mmol) at room temperature, and the mixture was stirred for 30 minutes, and then cooled to −40° C. A n-BuLi solution (0.50 g; 1.2 mmol) was added, and a mixed solution of PTBST (49.81 g; 283 mmol), p-t-butylstyrene (71.98 g; 449 mmol), and a dibutylmagnesium hexane solution (1.80 g; 2.5 mmol) was dropped over 40 minutes. After the completion of the dropping, the mixture was stirred for 30 minutes. Then, a solution in which diphenylethylene (0.30 g; 1.7 mmol) and a diethylzinc hexane solution (0.19 g; 0.3 mmol) were added to a 3.79% lithium chloride THF solution (3.26 g: 2.9 mmol) was dropped over 1 minute. After the completion of the dropping, the mixture was stirred for 15 minutes, and cooled to −50° C. Then, a mixed solution of MMA (17.78 g; 178 mmol) and a diethylzinc hexane solution (0.40 g; 0.6 mmol) was dropped over 12 minutes, and the mixture was stirred at the same temperature for 60 minutes. Methanol was added to stop the reaction. The reaction solution was measured by gas chromatography, but PTBST, p-t-butylstyrene, and MMA were not observed. Then, a polymer obtained by treatment as in Example 1 was reacted as in Example 1.

The results of analyzing the obtained polymer by GPC were Mw=153600 and a degree of dispersion=1.18. The result of analyzing the composition ratio by $^{13}$C-NMR was PHS/p-t-butylstyrene/MMA (molar ratio)=32/47/21.

INDUSTRIAL APPLICABILITY

According to the present invention, it is possible to provide a polymer excellent in heat resistance, crack resistance, high temperature adhesiveness, adhesion properties, and the like, used for chip stacking adhesives and the like.

The invention claimed is:

1. A copolymer comprising repeating units represented by formula (I), formula (II), and formula (III):

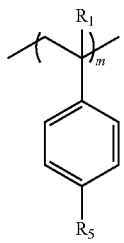

(I)

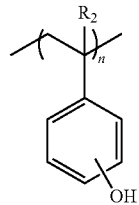

(II)

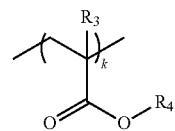

(III)

wherein $R_1$, $R_2$, and $R_3$ each independently represent a hydrogen atom or a methyl group; $R_4$ represents a linear or branched alkyl group, or a linear or branched alkyl group that is substituted by hydroxy group; $R_5$ represents a hydrogen atom or a $C_1$ to $C_6$ alkyl group; m, n and k represent a molar ratio of the respective repeating units; m , n and k each independently represents a positive number of more than 0 and less than 1, and satisfy a relation of m+n+k=1, and having a weight-average molecular weight in the range of 50,000 to 200,000, wherein two blocks consisting of the block comprising the repeating units represented by formula (I) and formula (II) and the block comprising the repeating unit represented by formula (III) are bonded by block bonding.

2. The copolymer according to claim 1 , wherein for the block comprising the repeating units represented by formula (I) and formula (II), the repeating unit represented by formula (I) and the repeating unit represented by formula (II) are randomly bonded.

3. The copolymer according to any one of claim 1, wherein a ratio of weight-average molecular weight (Mw) to number-average molecular weight (Mn) (Mw/Mn) is in the range of 1.01 to 1.50.

\* \* \* \* \*